June 14, 1927.  
W. E. MITCHELL  
SHORT TURN DEVICE FOR MOTOR VEHICLES  
Filed Nov. 1, 1923
1,632,665
Fig. 1
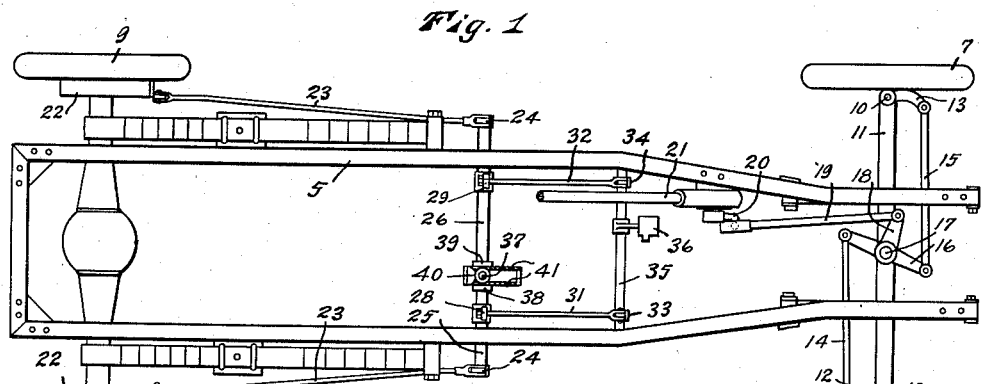
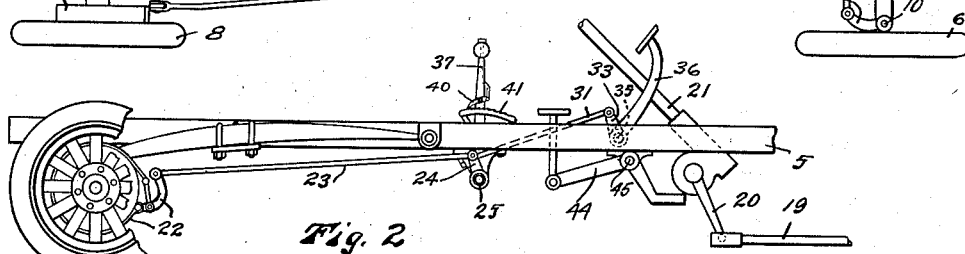
Fig. 2
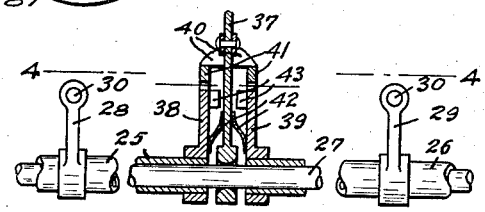
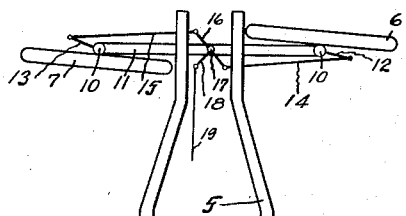
Fig. 3
Fig. 5
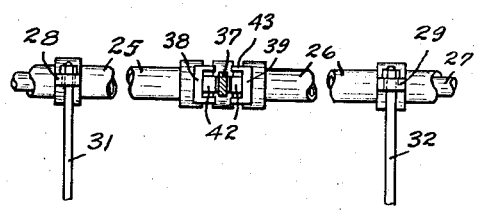
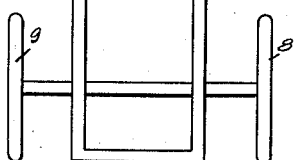
Fig. 4
INVENTOR  
Walter E. Mitchell
By Fred C. Matheny  
Attorney Patented June 14, 1927.

1,632,665

UNITED STATES PATENT OFFICE.

WALTER E. MITCHELL, OF SEATTLE, WASHINGTON.

SHORT-TURN DEVICE FOR MOTOR VEHICLES.

Application filed November 1, 1923. Serial No. 672,093.

My invention relates to improvements in short turn devices for motor vehicles and the object of my invention is to devise means for turning a motor vehicle on a radius substantially equal to, or less than the length of said vehicle.

A more specific object is to provide means for turning the front wheels of a vehicle substantially crosswise of said vehicle and for locking or holding one rear wheel so that when power is applied to the other rear wheel the vehicle will in effect pivot on the wheel that is locked or held and will be turned around in very little space.

Other and more specific objects will be apparent from the following description taken in connection with the accompanying drawings.

When motor vehicles are being handled in crowded places as in garages and parking areas it is often exceedingly desirable to turn said vehicles in the least possible space in order to get them into or out of crowded places. The usual motor vehicle steering apparatus will not permit turning of the vehicle without simultaneous forward or rearward movement thus making it impossible at times to get a vehicle into a place of small area where it may be desired to go, or to get it out of a place from which it may be desired to move, as for instance to move the vehicle out of a parking place or away from a curb when there are other vehicles close behind and in front. My invention makes it possible to get the vehicle into or out of, substantially any space that is as long as the vehicle.

In a general way the invention consists in providing a motor vehicle with steering mechanism that will permit the front wheels to be turned substantially crosswise of the vehicle and in providing means by which one rear or driving wheel may be locked or held in a fixed position so that when the driving power is applied to the rear axle the other rear wheel will cause the vehicle to swing around and pivot on the wheel that is locked or held.

In the accompanying drawings I have shown one preferred operative embodiment of my invention but it will be understood that the invention is capable of being embodied in many different forms and that said drawings are merely illustrative.

In the drawings, Figure 1 is a plan view of a motor vehicle chassis on which my invention is installed parts of the chassis being omitted.

Fig. 2 is a view in side elevation of the rear end of the same.

Fig. 3 is a view partly in cross section and partly in elevation showing certain brake operating means.

Fig. 4 is a view partly in plan and partly in cross section substantially on broken line 4—4 of Fig. 3.

Fig. 5 is a diagram illustrating the operation of the steering means.

Like reference numerals designate like parts throughout the several views.

In the drawings I have shown a motor vehicle frame 5 provided with right and left front wheels 6 and 7 respectively and right and left rear wheels 8 and 9 respectively. The front wheels are connected by pivots 10 with a transverse front axle 11 and are provided respectively with a rearwardly extending steering arm 12 and a forwardly extending steering arm 13. The outer ends of the steering arms 12 and 13 are connected by links 14 and 15 with opposite ends of a steering lever 16 that is fulcrumed on a fixed pivot 17 mid way between its two ends and that has a crank arm 18 projecting sidewise therefrom that is connected by an actuating bar 19 with a lever 20 on the bottom end of a steering post 21 of the usual form.

When the steering post 21 is turned the front wheels may be turned in the usual manner about the pivots 10 for steering the vehicle, but if the steering post 21 is turned more than the usual amount in a counter clockwise direction the front wheels 12 and 13 will be turned substantially crosswise of the vehicle, as shown in Fig. 5 and will lie substantially against the front axle 11 which will limit their turning movement and stop them just before they reach an exact transverse position.

If, when the front wheels are turned substantially crosswise of the vehicle, one rear wheel is anchored or held in a substantially fixed position and power is applied to the other rear wheel then the vehicle will pivot on the substantially fixed wheel and will be turned on a radius of less than its own length.

The rear wheels 8 and 9 are provided with the usual brakes 22 having brake operating rods 23 that are connected with lever arms 24 on brake operating sleeves 25 and 26 that are mounted on a transverse rod 27. Sleeves 25 and 26 are provided respectively with lever arms 28 and 29 having holes 30 in their upper ends for slidably receiving the rear ends of links 31 and 32 the forward ends of which links are connected with lever arms 33 and 34 on a transverse shaft 35 that is arranged to be oscillated by brake pedal 36. The links 31 and 32 have rigid stop means on their rear ends but are free to slide rearwardly through the levers. The mechanism just described constitutes means for operating the brakes in the usual manner.

In accordance with my invention I provide means for selectively applying the brake of either rear wheel without applying the opposite brake, which means may consist of a hand lever 37 mounted on transverse rod 27 between two levers 38 and 39 that are provided on the respective sleeves 25 and 26. The hand lever 37 is provided with pawls 40 movable over ratchet teeth on quadrants 41. Springs 42 normally hold the hand lever 37 in the mid position shown in Figs. 3 and 4 clear of both levers 38 and 39 but said hand lever may be moved to either side by exerting pressure thereon to selectively engage the same within a notched element 43 in either lever 38 or 39 whereby one sleeve 25 or 26 may be turned to set the brake on either rear wheel without setting the brake on the other rear wheel.

In operation if a motor vehicle on which this device is installed is to be turned in a short space the front wheels are turned substantially crosswise of the vehicle as shown in Fig. 5, the brake on one rear wheel is set by moving hand lever 37 first to one side and then forwardly and power is then applied to the other rear wheel thus causing the vehicle to pivot substantially on the wheel to which the brake is applied and causing the forward end of the vehicle to swing to one side.

If the left rear wheel is locked, power applied to drive the right rear wheel forwardly will swing the vehicle to the left and power applied to drive the right rear wheel rearwardly will swing the vehicle to the right. If the right rear wheel is locked forward movement of the left rear wheel will turn the vehicle to the right and rearward movement of the left rear wheel will turn the vehicle to the left.

Means for preventing the front vehicle wheels from turning more than the usual amount needed for steering except when a short turn is to be made is provided, which means may consist of a stop lever 44 pivoted as at 45 and arranged to have its front end form a stop for lever arm 20 on steering post 21. The rear end of stop lever 44 may be connected with an upwardly extending bar by which the rear end of said lever may be lifted to move the forward end of the same clear of lever 20 prior to turning the front vehicle wheels crosswise of the vehicle in making a short turn.

When the hand lever 37 is moved forwardly to set one brake only the link 31 or 32 may slide through the hole 30 in the lever arm 28 or 29 without moving the brake pedal 36.

Obviously many changes in this device may be made within the scope of the following claim.

I claim,

The combination with a motor vehicle having the usual driven rear wheels and having the usual front wheels pivoted for steering, said rear wheels having the usual brakes, of means for applying the brake to one of said rear wheels independently of the other rear wheel, and steering devices for said front wheels, said steering devices embodying a steering arm extending forwardly from the pivot of one front wheel, a steering arm extending rearwardly from the pivot of the other front wheel, a steering lever medially fulcrumed between said front wheels, links connecting the respective forward and rear ends of said steering lever with the forwardly projecting steering arm and the rearwardly projecting steering arm and means for turning said steering lever to steer said front wheels and to turn said front wheels substantially crosswise of the vehicle in one direction.

Seattle, Washington, October 27, 1923.

WALTER E. MITCHELL.